UNITED STATES PATENT OFFICE.

AARON B. BROWN AND WENDELL P. BROWN, OF WORCESTER, MASS.

IMPROVEMENT IN COATING METALS.

Specification forming part of Letters Patent No. 213,319, dated March 18, 1879; application filed January 9, 1879.

*To all whom it may concern:*

Be it known that we, AARON B. BROWN and WENDELL P. BROWN, residents of the city of Worcester, in the county of Worcester, in the Commonwealth of Massachusetts, have invented certain new and useful improvements in the covering of iron and other metallic substances with the more costly metals, such as tin and nickel; and we do hereby declare that the following is a description of the same.

Our invention is designed to be used in nickel-plating, silver-plating, galvanizing wire, and tinning wire, and covering all baser metals with those of a more costly kind; and it consists in substituting in the place of the acids and alkalies now used to cleanse the body to be covered another chemical compound, of an alkaline phosphatic character, which acts upon the metal as a cleanser, and operates as a flux in the subsequent treatment of the metal.

In the methods now practiced in covering one metal with another of a more costly and valuable kind it has been found necessary to use some kind of acid with sufficient dissolving qualities and power to cut and remove the foreign matter or substances which may have accumulated upon such body, the acid and salts formed being subsequently removed before coating the article; or the metal is first subjected to the action of an alkali or alkaline salt, which is subsequently removed; or the metal is subjected successively to the action of alkaline and acid solutions, and the compounds formed subsequently removed.

We have discovered that by subjecting the metal to the action of alkaline phosphates, such as phosphate of potash, the metal will be prepared for the reception of the metal with which it is to be coated or plated, and a compound formed thereon which will act as a flux in the subsequent operations, which not only obviates the subsequent treatment for the removal of the compound, but enables a much better union of the two metals to be obtained. The method of applying these chemical compounds in the processes above named is to dissolve the solid compounds in water, and then apply the liquid to the surface of the body to be cleansed and covered in the same way that acids have hitherto been used.

The effect of those alkaline phosphates upon the metal after it is covered is of a non-corroding tendency, and thereby obviates the now universal tendency of all plated and galvanized bodies to corrode beneath the plate, caused by the action of the acid upon the body covered, especially when the body covered is iron or steel.

Having thus described our invention, what we claim, and desire to secure by Letters Patent, is—

The method of preparing metals for plating or coating with other metals, by subjecting the same to the action of alkaline phosphates, as described, whereby a compound is formed on the metal which operates as a flux, and the surface of the same is prepared for the reception of the coating or plating, substantially as specified.

AARON B. BROWN.
              WENDELL P. BROWN.

Witnesses:
  JAMES TRACY,
  THEODORE P. BROWN.